(12) United States Patent
Kakimoto

(10) Patent No.: US 6,775,688 B1
(45) Date of Patent: Aug. 10, 2004

(54) DATA PROCESSING APPARATUS AND DATA PROCESSING METHOD

(75) Inventor: Atsushi Kakimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/546,318

(22) Filed: Apr. 7, 2000

(30) Foreign Application Priority Data

Apr. 9, 1999 (JP) .......................................... 11-102227

(51) Int. Cl.⁷ .......................................... G06F 15/16
(52) U.S. Cl. ..................................... 709/203; 709/201
(58) Field of Search .............................. 709/201, 203, 709/207, 206

(56) References Cited

U.S. PATENT DOCUMENTS

| | | | | |
|---|---|---|---|---|
| 5,923,846 A | * | 7/1999 | Gage et al. ................. | 709/213 |
| 6,033,065 A | * | 3/2000 | Ikezaki ........................ | 347/88 |
| 6,088,717 A | * | 7/2000 | Reed et al. .................. | 709/201 |
| 6,253,234 B1 | * | 6/2001 | Hunt et al. .................. | 709/213 |
| 6,327,612 B1 | * | 12/2001 | Watanabe .................... | 709/206 |
| 6,442,592 B1 | * | 8/2002 | Alumbaugh et al. ........ | 709/206 |
| 6,505,237 B2 | * | 1/2003 | Beyda et al. ................ | 709/206 |

* cited by examiner

Primary Examiner—Bunjob Jaroenchonwanit
(74) Attorney, Agent, or Firm—Fitzpatrick, Cella, Harper & Scinto

(57) ABSTRACT

By comprising a unit for designating a distribution destination on a network, unit for specifying data to be distributed to the designated distribution destination, unit for determining a distribution method for distributing the specified data, and unit for distributing the data to the designated distribution destination based on the determination, data is appropriately distributed by selecting a distribution method which is suitable to the amount of data to be distributed and the setting state of the network of the distribution destination.

40 Claims, 13 Drawing Sheets

FIG. 4

ADDRESS BOOK

FILE (F)   EDIT (E)   HELP (H)

INPUT NAME (N): TANAKA

| GROUP | あ か | さ た | な は | ま や | らわ | abc |
|---|---|---|---|---|---|---|
| MY FAVORITE | ORIGINATOR | | | OTHER | | |

| NAME | e-mail address | NETWORK INFORMATION |
|---|---|---|
| SATO | mamoru@cc.pp.com | atre |
| SUDA | suda@cc.co.jp | suda11.cc.co.jp |
| TANAKA | tanaka@pp.ne.jp | 150.32.100.2 |
| TANAKA | koh@dd.ne.jp | 172.101.20.3 |
| ◉CLUB MEMBER | | |
| NAKANO | miko@cse.cc.jp | flower.cse.co.jp |

ADD (A) >>

DESIGNATED DESTINATION (R):
KUROSHIMA
KIZAKI

DELETE (D)

OK     CANCEL

NEW (N)   NEW GROUP (G)   EDIT (M)

FIG. 8

| | | |
|---|---|---|
| INFORMATION ON RECEIVED DATA | NAME OF DATA | 71 |
| | DATA LOCATION | 72 |
| | APPLICATION PROGRAM | 73 |
| | DATA SIZE | 74 |
| | OTHER DATA INFORMATION | 75 |
| NETWORK INFORMATION OF DISTRIBUTION ORIGINATOR | NAME OF DISTRIBUTION ORIGINATOR | 76 |
| | E-MAIL ADDRESS OF DISTRIBUTION ORIGINATOR | 77 |
| | NETWORK NAME OF CLIENT APPARATUS | 78 |
| | IP ADDRESS | 79 |
| | DOMAIN | 710 |
| | OTHER NETWORK INFORMATION | 711 |
| OTHER IDENTIFICATION INFORMATION OF DISTRIBUTION ORIGINATOR | | 712 |
| DATE OF RECEPTION | | 713 |

FIG. 12

| DESTINATION | LINK TRANSMISSION | DISTRIBUTION DESTINATION SERVER |
|---|---|---|
| CLIENT A | ON | SERVER A |
| CLIENT B | ON | SERVER B |
| CLIENT C | ON | SERVER B |
| CLIENT D | ON | SERVER A |
| CLIENT E | OFF | |
| CLIENT F | OFF | |
| CLIENT G | ON | SERVER A |

DATA PROCESSING APPARATUS AND DATA PROCESSING METHOD

FIELD OF THE INVENTION

The present invention relates to a data processing apparatus and method thereof for performing appropriate data distribution processing by determining the size of distribution data and attributes of distribution destination network.

BACKGROUND OF THE INVENTION

In the conventional network apparatuses, when data is distributed to apparatuses connected to a network, an operator must manually perform data distribution operation for each of the apparatuses by designating an address of an electronic mail (to be referred to as e-mail) or defining link data in accordance with distribution destinations.

In the conventional technique, since it is difficult to separately set appropriate conditions for each attribute of distribution data and each environment of the distribution destination, the following problematic situations often arise. For instance, the distribution destination cannot access the distributed data; or an excessive load is imposed on the network because a large size of data is transmitted as attachment data to an e-mail or is distributed as real data to a large number of distribution destinations.

SUMMARY OF THE INVENTION

The present invention has been proposed to solve the conventional problems, and has as its object to provide a data processing apparatus and method thereof for performing appropriate data distribution by determining the size of distribution data and attributes of the distribution destination network.

More specifically, by performing data distribution according to the present invention, problems such as inaccessible data because of a difference in data attributes or overloading the network at the time of data distribution can be prevented.

In order to achieve the above objects, a data processing apparatus and method according to the present invention has the following configuration.

More specifically, the present invention provides a data processing apparatus comprising: distribution destination designation means for designating a distribution destination on a network; specifying means for specifying data to be distributed to the designated distribution destination; determination means for determining a distribution method of the specified data; and distribution means for distributing the data to the designated distribution destination based on the determination of the determination means.

According to an aspect of the present invention, the determination on the distribution method is made based on a criterion of whether or not the specified data is accessible by the designated distribution destination.

According to an aspect of the present invention, the determination on the distribution method is made based on a criterion such that distribution of the specified data does not impose an excessive load on network communication.

According to an aspect of the present invention, the determination means determines the distribution method based on a criterion such that the specified data satisfies a setting condition of a determination procedure item of the designated distribution destination.

According to an aspect of the present invention, the determination means determines the distribution method based on at least one of criteria: data size, attribute of distribution destination network, or setting of the distribution destination.

According to an aspect of the present invention, the distribution means distributes the specified data as link data to the designated distribution destination in accordance with the determined distribution method.

According to an aspect of the present invention, the distribution means distributes the specified data as real data to the designated distribution destination in accordance with the determined distribution method.

According to an aspect of the present invention, the distribution means distributes the specified data as attachment data to an electronic mail to the designated distribution destination in accordance with the determined distribution method.

According to an aspect of the present invention, the determination means determines whether or not the specified data is accessible by the designated distribution destination, and as a result of determination, in a case where the determination means determines that the specified data is accessible, link data to a network or real data of the specified data is distributed, whereas in a case where the determination means determines that the specified data is not accessible, the specified data is transmitted as attachment data to an electronic mail.

According to an aspect of the present invention, the determination means determines whether or not the size of the specified data is a predetermined size or larger, and in a case where the size of the specified data is the predetermined size or larger, the specified data is distributed as link data to a network of a distribution originator where the specified data is stored, whereas in a case where the size of the specified data is less than the predetermined size, the specified data is distributed as attachment data to an electronic mail, or real data of the specified data is distributed.

According to an aspect of the present invention, the data processing apparatus further comprises: distribution data transfer means for transferring the specified data to another distribution destination on a network which is accessible by the distribution destination, in a case where the distribution destination is unable to access the specified data on the network; and informing means for informing link data of the another distribution destination to the distribution destination.

According to an aspect of the present invention, the data processing apparatus further comprises distribution data obtaining means for downloading the specified data from the distribution originator or the another distribution destination based on the link data.

According to an aspect of the present invention, the data processing apparatus further comprises display control means for displaying brief contents of distributed data together with an icon identifying a data attribute, when data is distributed.

Furthermore, the present invention provides a data processing method, comprising the steps of: designating a distribution destination on a network; specifying data to be distributed to the designated distribution destination; determining a distribution method of the specified data; and distributing the data to the designated distribution destination based on the determination.

According to an aspect of the present invention, the determination on the distribution method is made based on a criterion of whether or not the specified data is accessible by the designated distribution destination.

According to an aspect of the present invention, the determination on the distribution method is made based on a criterion such that distribution of the specified data does not impose an excessive load on network communication.

According to an aspect of the present invention, in the determination step, the distribution method is determined based on a criterion such that the specified data satisfies a setting condition of a determination procedure item of the designated distribution destination.

According to an aspect of the present invention, in the determination step, the distribution method is determined based on at least one of criteria: data size, attribute of distribution destination network, or setting of the distribution destination.

According to an aspect of the present invention, in the distribution step, the specified data is distributed as link data to the designated distribution destination in accordance with the determined distribution method.

According to an aspect of the present invention, in the distribution step, the specified data is distributed as real data to the designated distribution destination in accordance with the determined distribution method.

According to an aspect of the present invention, in the distribution step, the specified data is distributed as attachment data to an electronic mail to the designated distribution destination in accordance with the determined distribution method.

According to an aspect of the present invention, in the determination step, it is determined whether or not the specified data is accessible by the designated distribution destination, and as a result of determination, in a case where it is determined that the specified data is accessible, link data to a network or real data of the specified data is distributed, whereas in a case where it is determined that the specified data is not accessible, the specified data is transmitted as attachment data to an electronic mail.

According to an aspect of the present invention, in the determination step, it is determined whether or not the size of the specified data is a predetermined size or larger, and in a case where the size of the specified data is the predetermined size or larger, the specified data is distributed as link data to a network of a distribution originator where the specified data is stored, whereas in a case where the size of the specified data is less than the predetermined size, the specified data is distributed as attachment data to an electronic mail, or real data of the specified data is distributed.

According to an aspect of the present invention, the data processing method further comprises the steps of: transferring the specified data to another distribution destination on a network which is accessible by the distribution destination, in a case where the distribution destination is unable to access the specified data on the network; and informing link data of the another distribution destination to the distribution destination.

According to an aspect of the present invention, the data processing method further comprises the distribution data obtaining step of downloading the specified data from the distribution originator or the another distribution destination based on the link data.

According to an aspect of the present invention, the data processing method further comprises the display control step of displaying brief contents of distributed data together with an icon identifying a data attribute, when data is distributed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an explanatory view of designating a distribution destination;

FIG. 12 is a table showing relations between data distribution destinations and distribution destination servers.

DETAILED DESCRIPTION OF THE
PREFERRED EMBODIMENTS

Preferred embodiments of the present invention will now be described in detail in accordance with the accompanying drawings.

First, a large-scale network, where a data processing apparatus according to the present invention is used for data distribution, is described.

Figure 1:
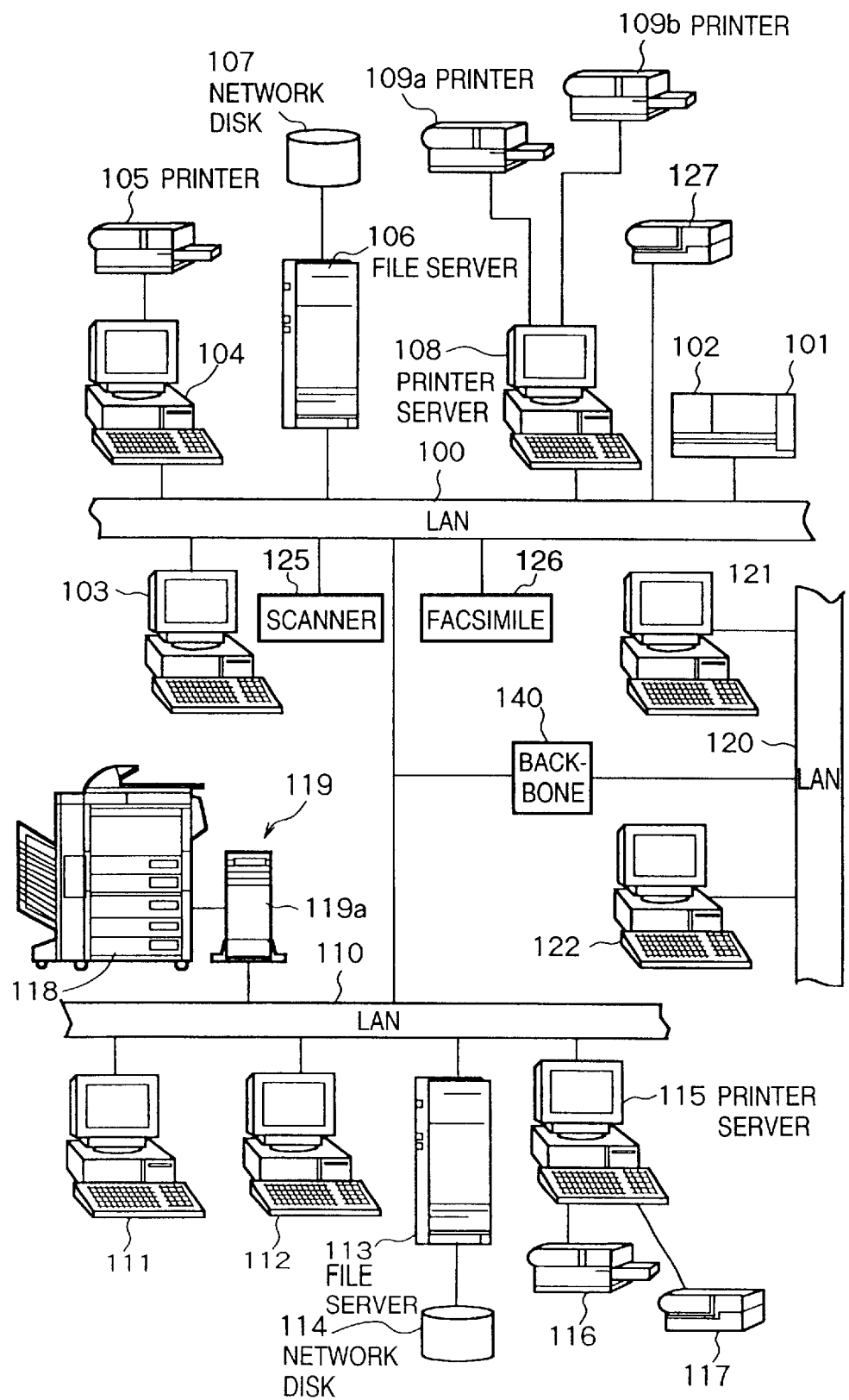
FIG. 1 shows a system construction according to an embodiment of the present invention.

In FIG. 1, reference numeral 101 denotes a network board (hereinafter referred to as NB) for connecting a printer 102, having an open-type architecture, to a network. The NB 101 is connected to a local area network (LAN) 100 via a LAN interface such as an Ethernet interface 10Base-2 having a coaxial connector or a 10Base-T interface having an RJ-45.

A plurality of personal computers (PCs) such as a PC 103 and a PC 104 also are connected to the LAN 100. The PCs 103, 104 are capable of communicating with NB 101 under the control of the network operating system. Under this condition, one of the PCs, e.g., PC 103, can be designated as a network administrator. A printer such as the printer 105, which is connected to the PC 104, may be connected to the PC 103.

A file server 106 is connected to the LAN 100 and manages access to files that have been stored in a large-capacity (e.g., 10-gigabyte) network disk 107. A scanner 125 and facsimile 126, respectively connected to the LAN 100, are sharable in the network, and enable image data input or data transmission/reception.

A printer server 108 causes the locally connected printers 109a and 109b, or a printer 105 remotely connected to the PC 104, to perform printing. Other peripherals (not shown) may also be connected to the LAN 100.

More specifically, the network shown in FIG. 1 is capable of using network software such as Novell or UNIX software in order that the network members may communicate efficiently. It is possible to use any network software. For example, Novell NetWare (the registered trademark of Novell, Inc.) software can be used. For a detailed description relating to this software package, refer to the on-line documentation included with the NetWare package. The on-line documentation comes with the purchase of the NetWare package.

The construction shown in FIG. 1 is briefly described. The file server 106 serves as a file manager so that the members of the LAN can perform data reception, storage, queuing, caching and data distribution. For example, separate data files that have been created by the PCs 103, 104 are sent to the file server 106. The file server 106 then places the data files in order and, in accordance with a command from the printer server 108, transmits the ordered data files to the printer 109a.

The PCs 103 and 104 are ordinary PCs that are capable of generating data files, distributing the generated data files to apparatuses connected to the LAN 100, receiving data files from the LAN 100 and displaying and/or processing the received data files.

It should be noted that while these PCs are illustrated in FIG. 1 as being ordinary personal computers, other computers may be included in the network as long as they are capable of executing the network software. For example, if UNIX software is being used, UNIX workstations may be included in the network and these workstations can be used together with the illustrated PCs under suitable conditions.

LANs such as the LAN 100 are ordinarily used to provide service to a user group located on one floor or on a number of successive floors of one building, or to a somewhat local user group. For example, a wide area network (WAN) may be constructed to deal with a situation in which certain users are located more remote from other users, such as when certain users are located in another building, prefecture or state. Basically, a WAN is an aggregate of several LANs and is formed by connecting the LANs using high-speed digital lines such as high-speed ISDN (Integrated Services Digital Network) telephone lines. Accordingly, as shown in FIG. 1, a WAN is formed by connecting the LAN 100, a LAN 110 and a LAN 120 via a modulator-demodulator (MODEM)/transponder 130 and a backbone 140. These connections are simple electrical connections using a plurality of buses. Each LAN has a dedicated PC and, though not necessarily required, usually includes a file server and a printer server.

Accordingly, as shown in FIG. 1, the LAN 110 includes PCs 111 and 112, a file server 113, a network disk 114, a printer server 115 and printers 116, 117. By contrast, the LAN 120 includes only PCs 121 and 122. The devices connected to the LANs 100, 110 and 120 can access the functions of the devices of the other LANs via the WAN.

<Installing Agent on Network Board>

The installation of an agent on a network board for connecting a printer to a network is considered as an example of agent installation. This makes it possible to place the printer under the management of the network administration software. By using the network administration software, a user can obtain information on the printer under control and can modify the status of the printer. More specifically, the user can obtain a character string being displayed on a liquid crystal display panel of the printer, or can change a default paper supply cassette.

<System Block Diagram>

Figure 2:
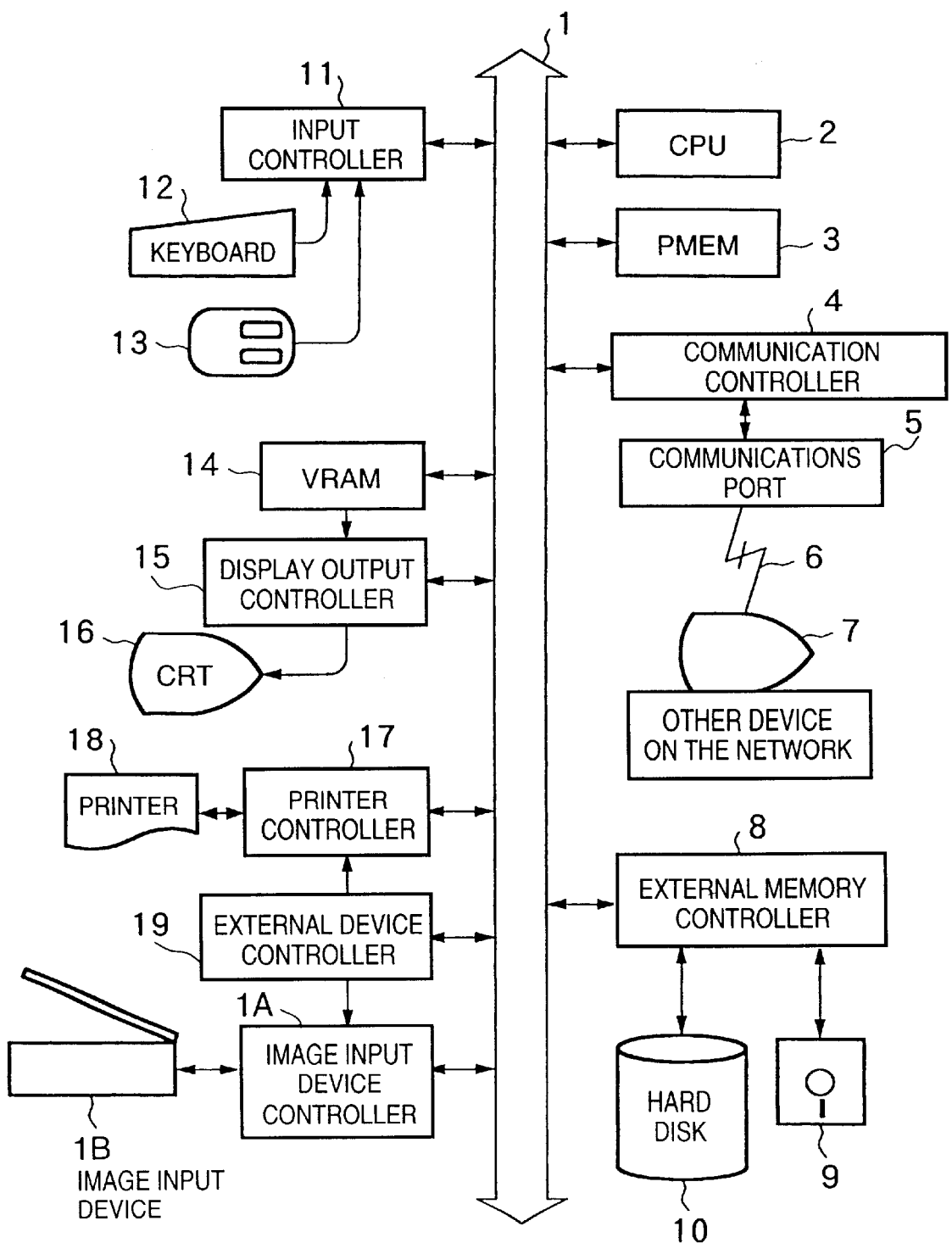
FIG. 2 is a system block diagram of a data processing apparatus according to the embodiment of the present invention.

FIG. 2 is a system block diagram showing a data processing apparatus according to the present invention. Reference numeral 1 denotes a system bus to which respective components are connected; 2, a central processing unit (CPU); and 3, program memory (to be referred to as PMEM) where selected and read programs from hard disk 10 are stored for data distribution processing to be executed by the CPU 2. Data inputted from a keyboard 12 is stored as code data in the PMEM 3 which also serves as a text memory. Reference numeral 4 denotes a communication controller which controls data input/output of a communication port 5. Signals outputted from the communication port 5 are transmitted to a communication port of another apparatus in the network via a communication line 6. Communication with printers or image input devices shared by the network is performed through the communication controller 4.

Although the present embodiment describes a network such as a LAN, the present invention is also applicable to a case where a communication port or a communication line of a public switched network is connected to the communication controller 4. Reference numeral 8 denotes an external memory controller; and 9 and 10, disks for storing data files, wherein 9 denotes a floppy disk (FD) and 10 denotes a hard disk (HD). Reference numeral 11 denotes an input controller, to which input devices, e.g., keyboard 12 and mouse 13, are connected. An operator inputs system operation commands by operating the keyboard 12.

Reference numeral 13 denotes a pointing device (PD) for editing image data on a CRT 16. In the present embodiment, a mouse is used as PD. With the use of the mouse, the cursor on the CRT 16 is arbitrarily moved in the X or Y direction to select a command icon on a command menu, thereby instructing to perform processing or designating an editing object or drawing position or the like. Reference numeral 14 denotes a video image memory (VRAM); 15, a display output controller; and 16, a CRT. Data displayed on the CRT 16 is developed in the VRAM 14 as bit map data. Reference numeral 17 denotes a printer controller which controls data output to a printer 18 which is connected to the printer controller 17. Reference numeral 1A denotes an image input device controller which controls an image input device 1B connected to the image input device controller 1A. In the image input server apparatus according to the present invention, the image input device controller 1A and image input device 1B are essential components. However, these components are not required at the client side since client apparatuses can use these components, shared at the server side, through the communication controller 4 and communication port 5.

Furthermore, in the construction shown in FIG. 2, even if the data processing apparatus and a controller of the data processing apparatus are provided as physically separate components, or even if the image input device and a controller of the image input device are provided as one component, the function of the data processing apparatus does not change.

<Designating Distribution Destination>

Figure 3:
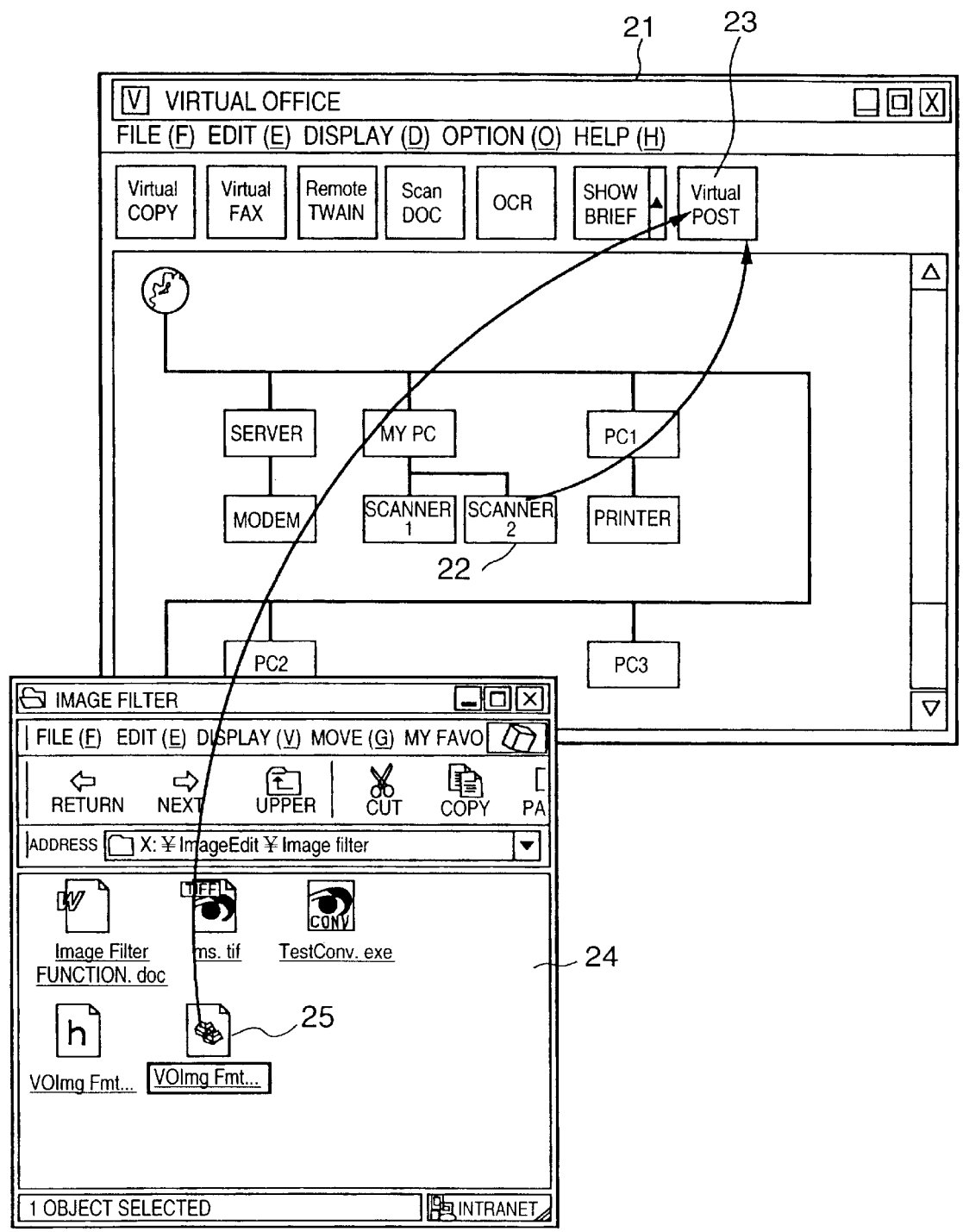
FIG. 3 is an explanatory view of specifying distribution data.

FIG. 3 is an explanatory view of specifying distribution data in the data processing apparatus according to the present invention. In FIG. 3, reference numeral 21 denotes a distribution designation dialogue which shows information regarding terminals in the network and shared input/output devices connected to these terminals.

Reference numeral 22 denotes a scanner shared by the network. A user can perform an original-document reading processing by designating a desired scanner in the dialogue 21.

Reference numeral 23 denotes a distribution-function instruction button. When the user drags a desired object and drops it on this button 23, the object is distributed to a desired destination. When distribution processing is designated, a distribution destination designation dialogue shown in FIG. 4 is displayed.

Reference numeral 24 denotes a file manager dialogue shown as an example. From this dialogue, an object (file), subjected to distribution, can be designated. Reference numeral 25 denotes a file object in the file manager. By moving the icons as indicated by the two arrows in FIG. 3, the file object can be distributed to a desired destination, or image data can be read by the scanner and distributed to a desired destination.

FIG. 4 is an explanatory view of designating a data distribution destination in the data processing apparatus according to the present embodiment. In FIG. 4, reference numeral 31 denotes a distribution destination designation dialogue. In the dialogue, contents of distribution destination database are displayed by referring to the database, and a desired distribution destination can be designated from the dialogue. Reference numeral 32 denotes distribution destination information. Distribution destination information includes: destination name, e-mail address, network information and so on (for more details, refer to the data structure of distribution destination information shown in FIG. 5). Reference numeral 33 denotes a control key for newly registering distribution destination information or editing existing information.

Reference numeral 34 denotes a control key for selecting, from the displayed distribution destination information 32, a distribution destination to actually transmit data to. Reference numeral 35 denotes a distribution destination name designated by the control key 34. Data specified in FIG. 3 (e.g., 25 in FIG. 3) is distributed to the distribution destination names indicated by reference numeral 35 in FIG. 4. Reference numeral 36 denotes a control key for designating execution/cancellation of the distribution processing.

<Distribution Destination Information>

Figure 5:
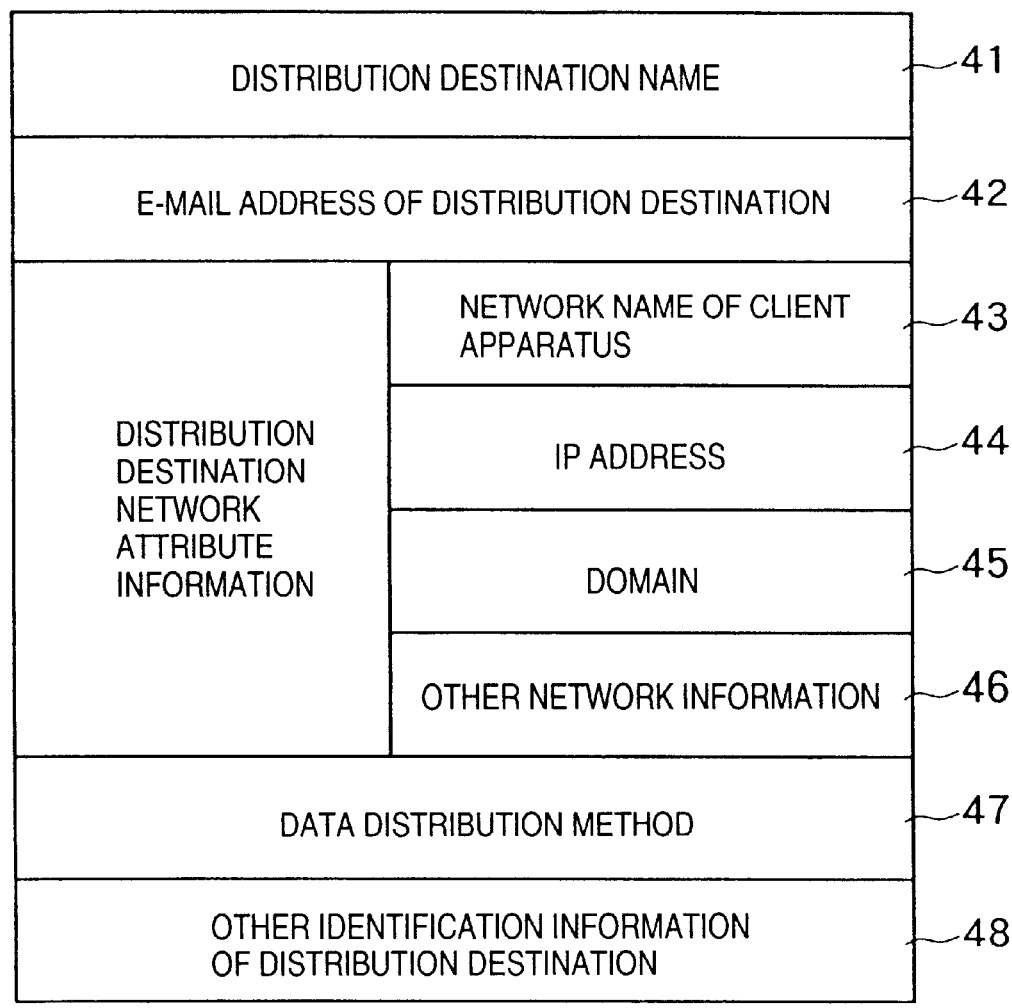
FIG. 5 shows a data structure of distribution destination information.

FIG. 5 shows a data structure of distribution destination information according to the present embodiment. Reference numeral 41 denotes the name of the distribution destination; 42, the e-mail address of the distribution destination; and 43–46, network attribute information of a client apparatus of the F; distribution destination. The data processing apparatus according to the present embodiment determines based on the network attribute information whether or not the distribution destination is capable of accessing the distributed data when the distribution destination receives the distributed data as link data.

For instance, if it is determined based on the information regarding a domain 45 that the distribution destination belongs to the same domain as that of the distribution originator, the distribution data is transmitted to the server of the domain and link data is transmitted to the distribution destination. Even if the domain of the distribution destination differs from that of the distribution originator, as long as the domain is a predetermined domain, it may be determined that the distribution destination can access the distributed data.

Reference numeral 43 denotes the network name of a client apparatus, i.e., the identification name of the client apparatus on the network, used by an operator of the distribution destination for receiving distributed data. Reference numeral 44 denotes the IP address of the client apparatus. If the client apparatus also employs another network protocol, then identification information in that network according to the protocol is set as an IP address. Reference numeral 45 denotes domain information of the client apparatus of the destination. Reference numeral 46 denotes identification information on other networks.

Reference numeral 47 denotes information related to the data distribution method. The data processing apparatus according to the present embodiment determines which distribution method to employ by referring to this information. Reference numeral 48 denotes other identification information of the distribution destination. For instance, a telephone number, facsimile number and so on, which are not directly related to data distribution processing in the network, are set as the identification information.

<Data Distribution Processing>

Figure 6:
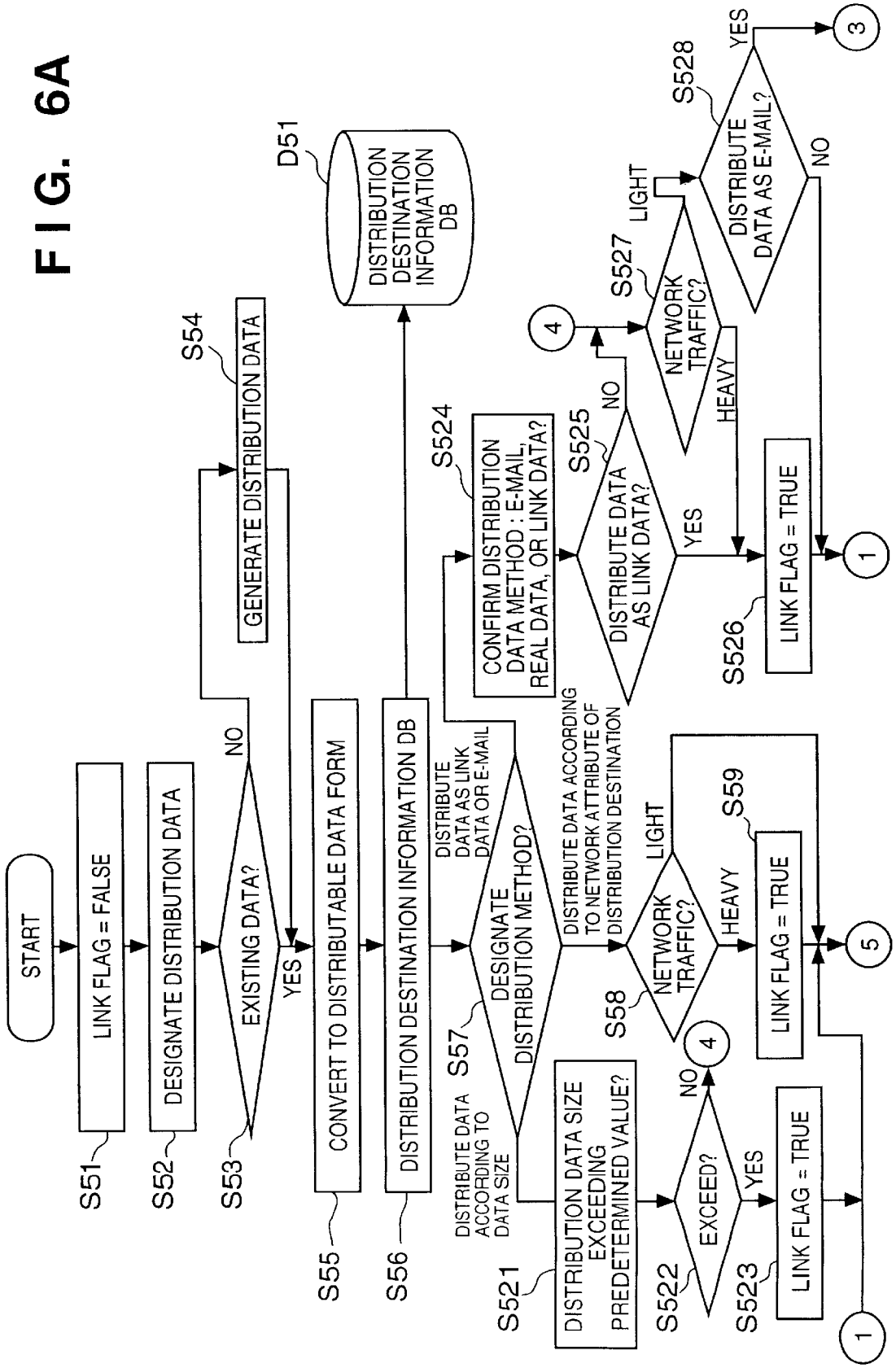
FIGS. 6A and 6B are flowcharts showing distribution processing of the data processing apparatus according to the embodiment of the present invention.

FIGS. 6A and 6B are flowcharts showing distribution processing of the data processing apparatus according to the present embodiment. Hereinafter, the processing contents will be described.

In step S51, flag setting is initialized by setting LINK FLAG=FALSE. The flag is referred to determine whether or not the data is to be distributed as link data. In the subsequent processing, if the flag is set to TRUE, data is distributed as link data, while if the flag is set to FALSE, data is distributed as real data, or as attachment data to an e-mail.

In step S52, distribution data is designated by the operation shown in FIG. 3.

In step S53, whether or not the distribution data is existing data is designated. Herein, the _ existing data _ is an existing file, while non-existing data is data which must be newly generated by input operation from a scanner, which is designated by drag and drop operation or the like. If it is determined as existing data in step S53, the control proceeds to step S55, whereas if it is determined as non-existing data, the control branches to step S54.

In step S54, data is read from an input device and distribution data is generated. Then, the control proceeds to step S55.

In step S55, the data designated as distribution subject is converted to a data form which is distributable in the network.

In step S56, a distribution destination is designated as shown in FIG. 4 and the distribution destination information is obtained. In this stage, a distribution destination information database D51 is referred to.

In step S57, a distribution method is determined by referring to the contents set in the data distribution method 47 in FIG. 5. If the distribution method is to be decided based on the size of distribution data, the control proceeds to step S521. If distribution as link data or distribution as attachment data to an e-mail is designated by the data distribution method information 47, the control proceeds to step S524. If the distribution method is to be decided based on a network attribute of the distribution destination, the control proceeds to step S58.

In step S58, the current traffic state in the network is checked. If it is determined that the traffic is heavier than a predetermined traffic amount, the control proceeds to step S59 since the load imposed on the network would be smaller if data is distributed as link data. If it is determined that the traffic is lighter than the predetermined amount, the control proceeds to step S510 (FIG. 6B).

In step S59, LINK FLAG=TRUE is set to transmit data as link data.

Referring to FIG. 6B, a network attribute of the distribution destination is confirmed in step S510.

In step S511, if it is determined that the distribution destination is capable of accessing the distributed data based on link data, or that the data can be distributed directly to the distribution destination as real data, the control proceeds to step S512, otherwise, the control proceeds to step S516. The determination herein is made based on the destination information shown in FIG. 5.

In step S512, the state of the LINK FLAG is referred to, and if the flag is TRUE, the control proceeds to step S513, while if the flag is FALSE, the control proceeds to step S515.

In step S513, link data (not the distribution data itself but information indicative of the location of the distribution data), which can be accessed by the distribution destination, is generated.

In step S514, the link data is distributed to the designated destination.

In step S515, the real data is distributed to the distribution destination.

In step S516, information on another distribution server, which is accessible by the distribution destination, and to which the data processing apparatus according to the present embodiment can distribute data, is obtained. To obtain distribution server information, database D52 having distribution server information is referred to.

The distribution server information database D52, managed by an administration server, stores information regarding client apparatuses belonging to the same domain, client information (address or the like) of other domains, and servers (file server or the like) accessible by each client apparatus. If a client apparatus has a plurality of accessible servers, the database D52 stores the correspondence between the client apparatus and the plurality of servers.

The administration server periodically communicates with other administration servers, which manage other domains, to update the contents of the server information database D52.

In cases where identical data is distributed to a plurality of client apparatuses, a server accessible by two or more distribution destination client apparatuses is detected. To the detected server, the data is transmitted, and to the corresponding client apparatuses, link data is transmitted.

For instance, based on a designated distribution destination and database 52, destination management information shown in FIG. 12 is generated. Then, the data is distributed to the servers A and B, link data to the server A is transmitted to the clients A, D and G, and link data to the server B is transmitted to the clients B and C.

In step S517, whether or not there is another server terminal satisfying the condition is determined. If another server is found, the control proceeds to step S520, but if not, the control proceeds to step S518.

In step S518, e-mail data is generated to transmit the distribution data as attachment data to the e-mail.

In step S519, the generated e-mail data is transmitted to the distribution destination.

In step S520, data is distributed to the another server found in step S517, then the control returns to step S513. In this case, in step S513, link data indicative of a location of the distribution destination server is generated. Then, the processing in step S514 is performed as described above.

Referring back to FIG. 6A, in step S521, the size of the distribution data is determined. In step S522, if the size of distribution data exceeds a predetermined size, the control proceeds to step S523, while if the size does not exceed the specified size, the control proceeds to step S527.

In step S523, since the distribution data size is larger than the specified value, the distribution data is distributed as link data so as not to impose an excessive load on the network. For this, the flag is set to LINK FLAG=TRUE. Then, the control proceeds to step S510 (FIG. 6B).

In step S524, the distribution method set in the distribution destination information is confirmed.

In step S525, if the distribution destination information designates to transmit distribution data as link data, the control proceeds to step S526, while if the information designates to transmit the distribution data by other methods, the control proceeds to step S527.

In step S526, the flag is set to LINK FLAG=TRUE to specify the data distribution as link data.

In step S527, the current traffic state in the network is checked. If it is determined that the traffic is heavier than a predetermined amount, the control proceeds to step S526 so as not to distribute data as an e-mail or real data which causes an increased network traffic. If it is determined that the traffic is lighter than a predetermined amount, the control proceeds to step S528 since the data can be transmitted as attachment data to an e-mail or as real data.

In step S528, if the distribution destination information designates to transmit distribution data as an e-mail, the control proceeds to step S518 (FIG. 6B), while if the information designates to transmit the distribution data as real data, the control proceeds to step S510 (FIG. 6B).

Note that the foregoing description has been provided on an example of determining the data distribution method based on the distribution data size, network traffic, or distribution destination's network accessibility condition.

If the data distribution method is to be determined based only on the distribution destination's network accessibility condition, the control may proceed from step S56 to step S510.

<Reception Screen>

Figure 7:
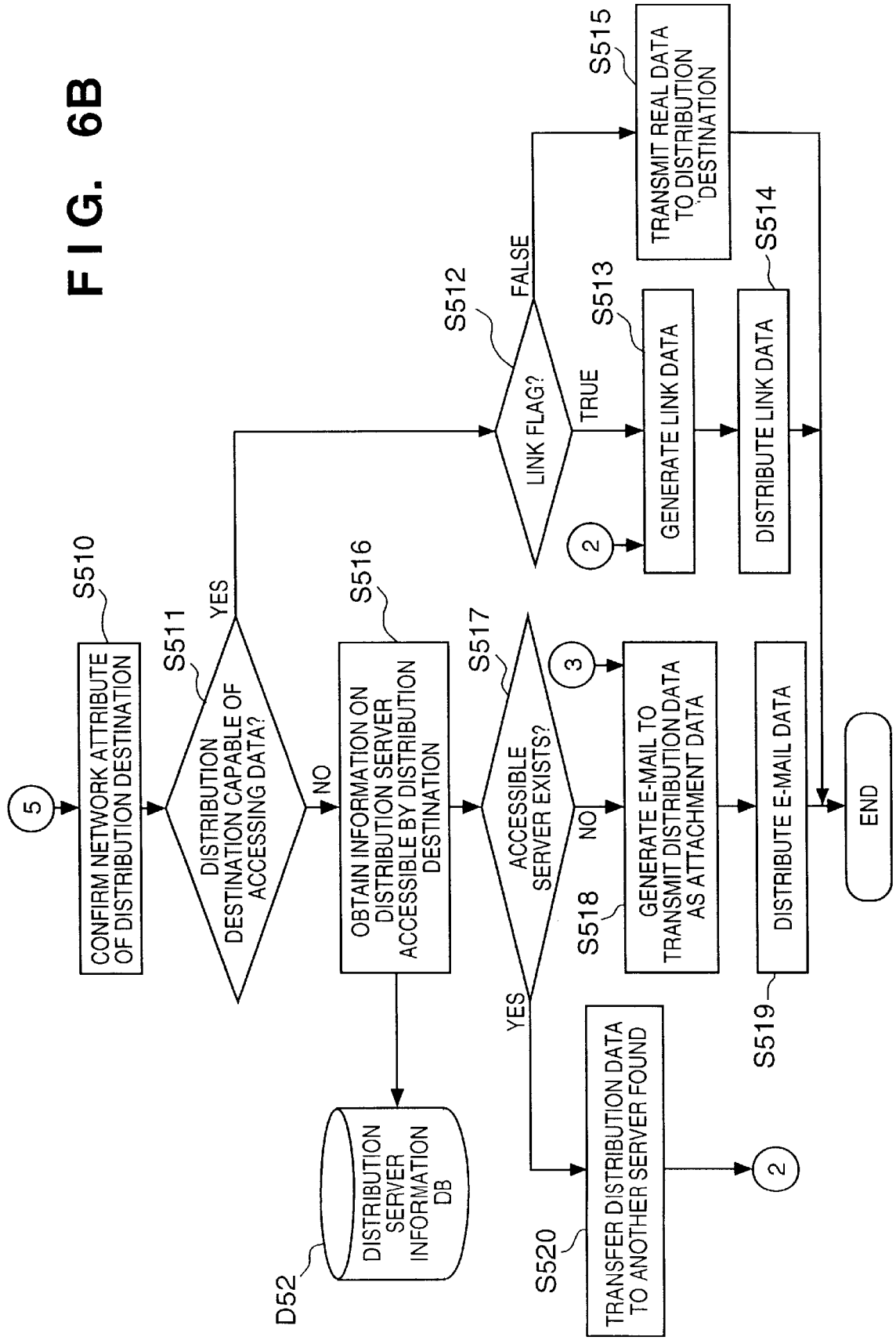
FIG. 7 is an explanatory view of receiving distributed data.

FIG. 7 shows a distribution data reception screen of a client terminal apparatus according to the present embodiment. In FIG. 7, reference numeral 61 denotes a reception dialogue. Reference numeral 62 denotes a folder holding received data. Reference numeral 63 denotes information items (details will be described in FIG. 8) of received data. Reference numeral 64 denotes each of the received data. On the left end of the received data information, an icon indicative of the application program associated with the distributed data is displayed. These items are shown to operators in the same manner regardless of whether the actually distributed data is link data or attachment data to an e-mail. The icon and brief information of the distributed data are combined and displayed on the CRT 16 by utilizing the combination of the CPU 2 and display output controller 15 as display control means.

In this example, start-up of the associated application program or storing of the designated file can be realized by designating each of the received items. In a case where the distribution data is transmitted as mail data, start-up of the associated application program or storing of the designated file can be performed by utilizing the actual data transmitted to the client apparatus.

In a case where the distribution data is distributed as link data, if a request is made to start up the associated application program or store the designated file, the actual data is downloaded from the linked server and transferred to the designated application program, or stored in a designated storage.

<Structure of Received Data>

Figure 8:
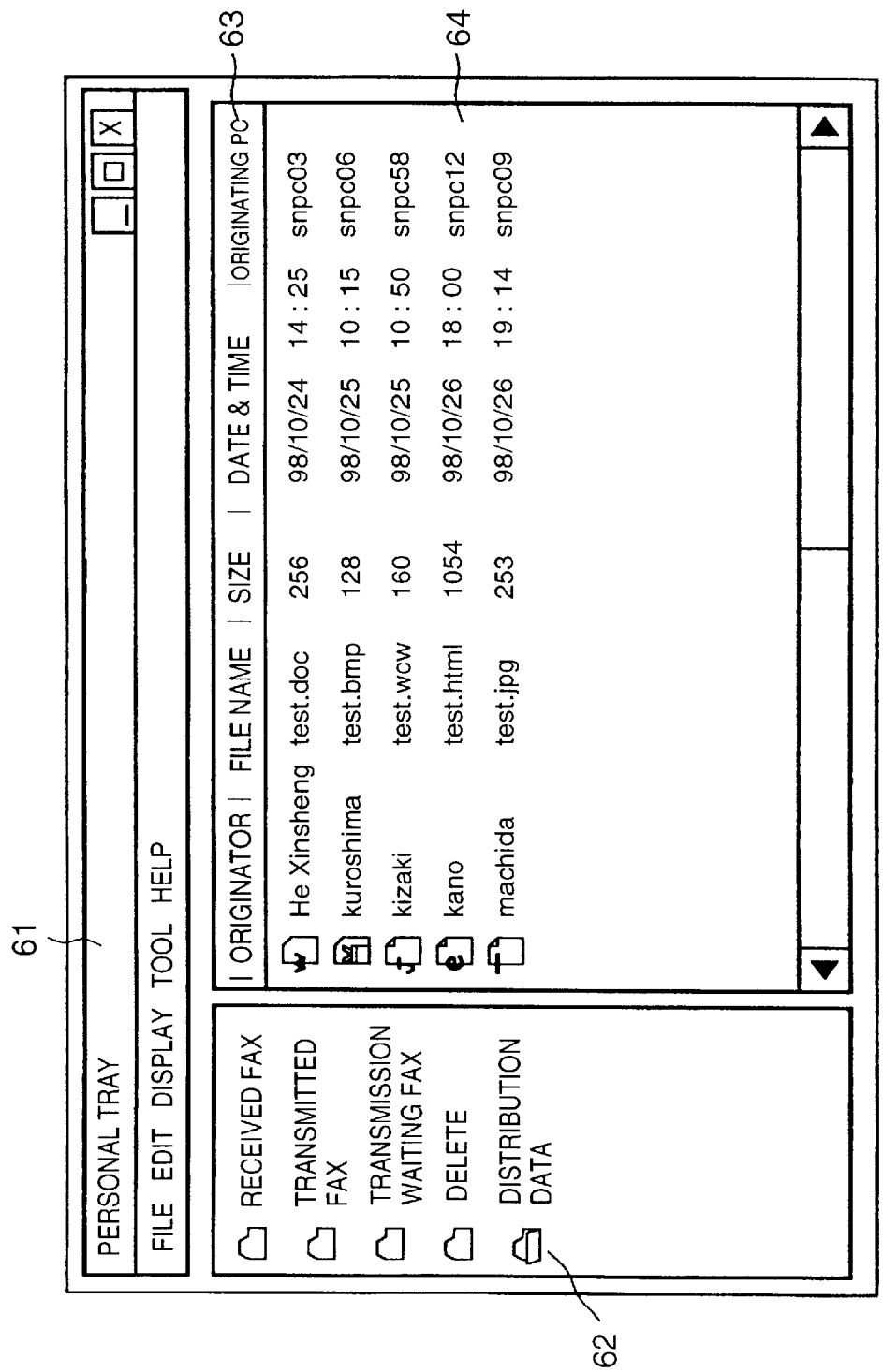
FIG. 8 shows a data structure of received data.

FIG. 8 shows a data structure of received data according to the present embodiment. In FIG. 8, reference numerals 71 to 75 denote information of received data; 76 to 711 denote network information of a distribution originator.

Reference numeral 71 denotes the name of distributed data. Reference numeral 72 denotes the location where the distributed data exists. In a case where the data is distributed as attachment data to an e-mail, the real data of the distributed data is stored in a client apparatus, and 72 has the path information only. In a case where the data is distributed as link data, 72 has link information only, and the real data of the distributed data is not stored in the client apparatus. Reference numeral 73 denotes information related to the application program used by the distribution originator for generating the distribution data. If the client apparatus does not have the corresponding application program, the data file is opened by using a related application program stored in the client apparatus. Reference numeral 74 denotes the size information of the distributed data. Reference numeral 75 denotes other data management information.

Reference numeral 76 denotes the name of the distribution originator; 77, e-mail address of the distribution originator; and 78, network name of the server terminal apparatus of the distribution originator. Reference numeral 79 denotes the IP address of the server terminal apparatus of the distribution originator; 710, domain information of the distribution originating terminal apparatus; 712, other identification information of the distribution originator; and 713, information on the received date.

<Confirmation of Network Attribute>

Confirmation processing of a network attribute according to the present embodiment is described with reference to the flowchart in FIG. 9. This processing is performed in step S57 in FIG. 6A.

In step S81, a setting file for the network attribute confirmation procedure is read. With regard to the data structure of the setting file, detailed description will be provided with reference to FIG. 11. According to the embodiment of the present invention, basically a combination of the setting file and an attribute determination module described in the setting file can confirm an arbitrary network attribute.

In step S82, the number (N) of the confirmation procedure is read from the setting file, and a loop counter i for repeat processing is initialized to 1. This indicates that N number of confirmation procedures are registered in the setting file, and the confirmation modules are executed in the registered order.

In step S83, the network attribute confirmation procedure registered at i-th number is executed. In step S84, it is determined by determination of the attribute determination module, whether or not the distribution destination is on a network accessible to distribution data. If it is determined that the distribution destination is on the network accessible to the distribution data, the control proceeds to step S85, while if not, the control proceeds to step S86. In step S85, the loop counter is incremented, preparing for the next attribute determination procedure.

In step S86, it is decided that the distribution destination is not on a network accessible to the distribution data, and the processing ends.

In step S87, it is determined whether or not the incremented loop counter has exceeded a value of the number of procedures registered in the setting file. If it has exceeded, the control proceeds to step S88, while if not, the control returns to step S83 for executing the next confirmation procedure. In step S88, as a result of all the attribute confirmation procedures, determination is made that the distribution destination is on a network accessible to the distribution data, and the control ends.

<Specific Example of Determination Processing>

Figure 9:
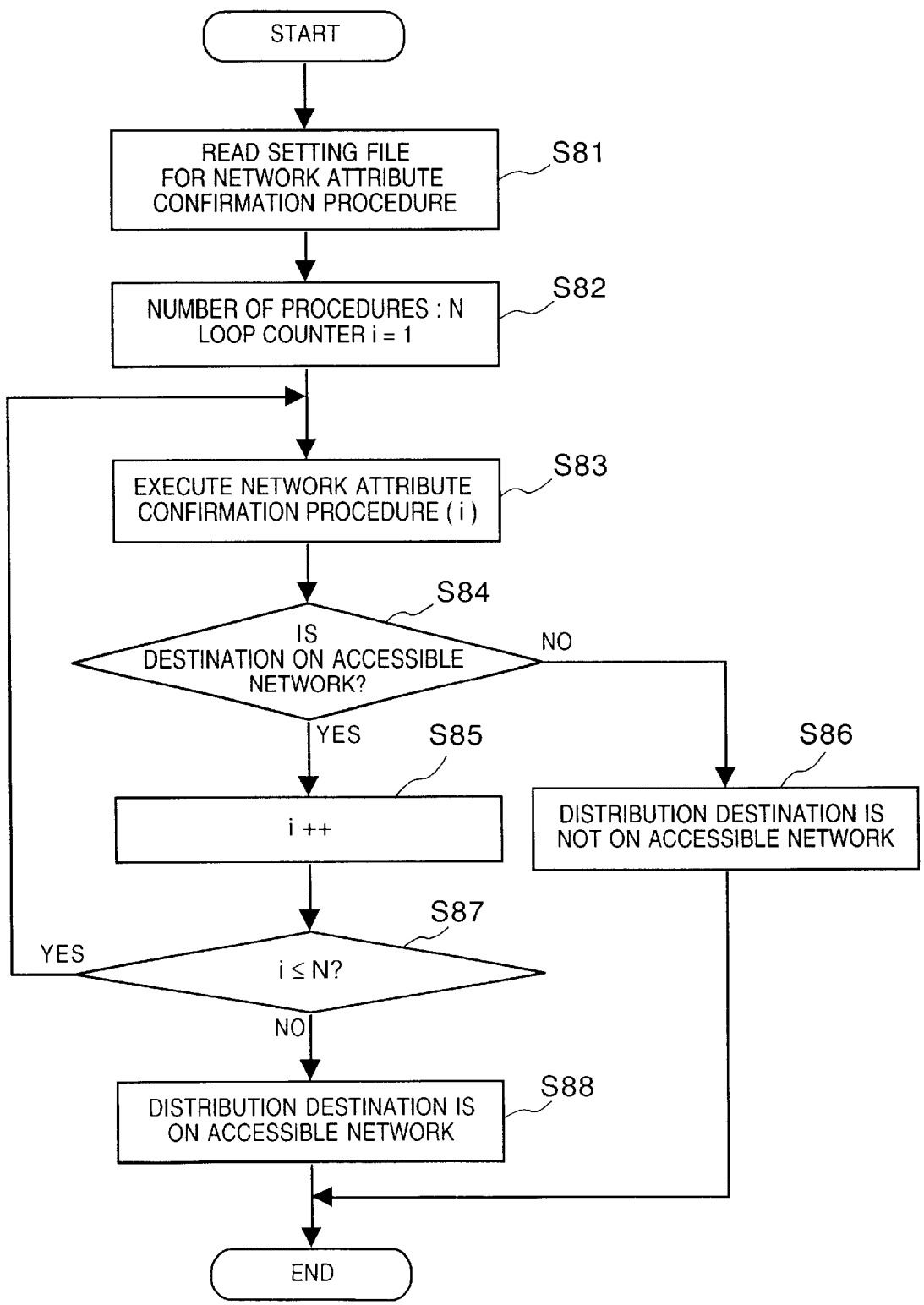
FIG. 9 is a flowchart explaining network attribute confirmation processing.
Figure 10:
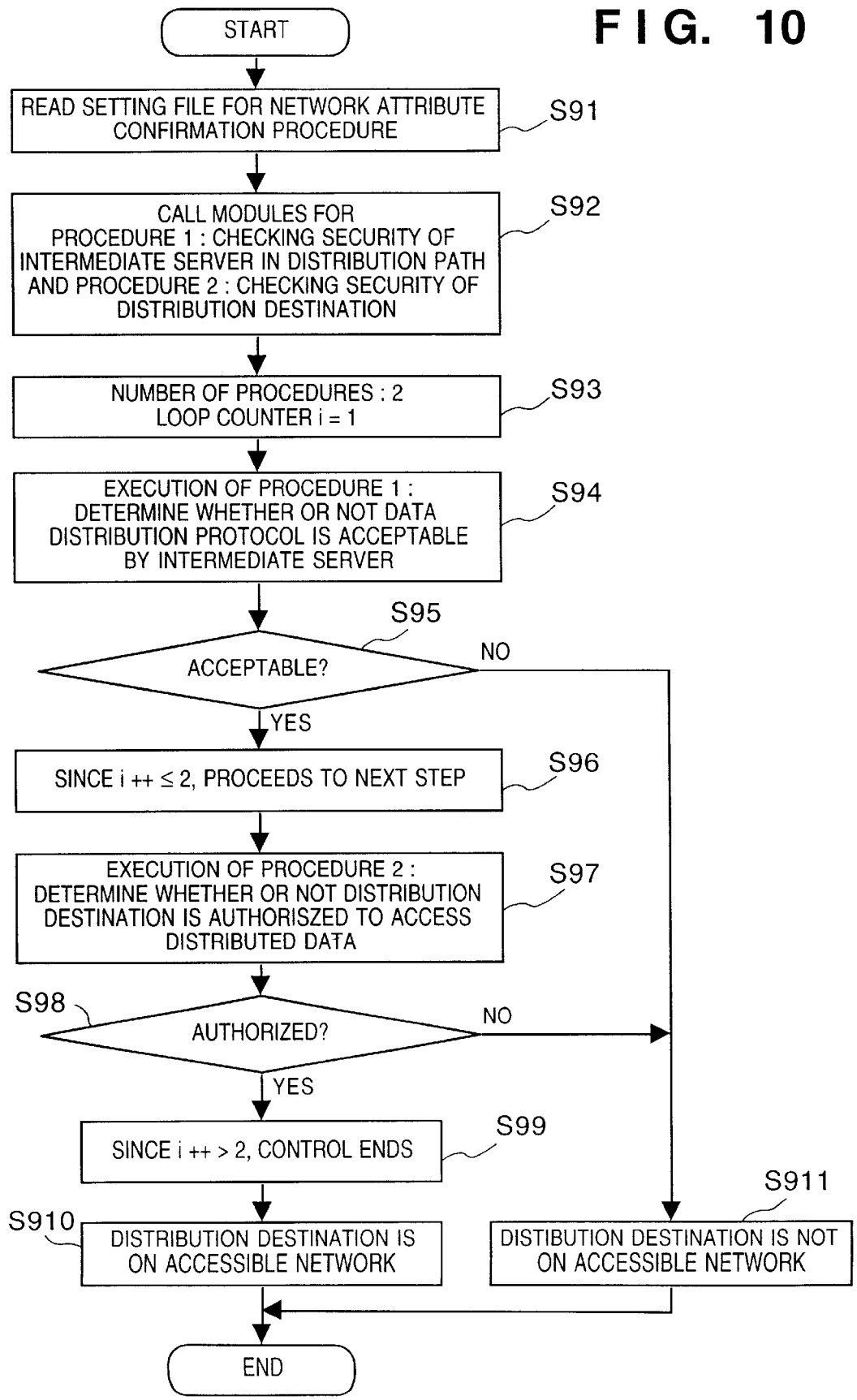
FIG. 10 is a flowchart describing a specific example of determination processing.

FIG. 10 is a flowchart describing a specific example of determination processing in FIG. 9. Hereinafter, the network attribute confirmation processing for the following three confirmation items will be described.

Determination procedure (1): network traffic

Determination procedure (2): security of intermediate server

Figure 11:
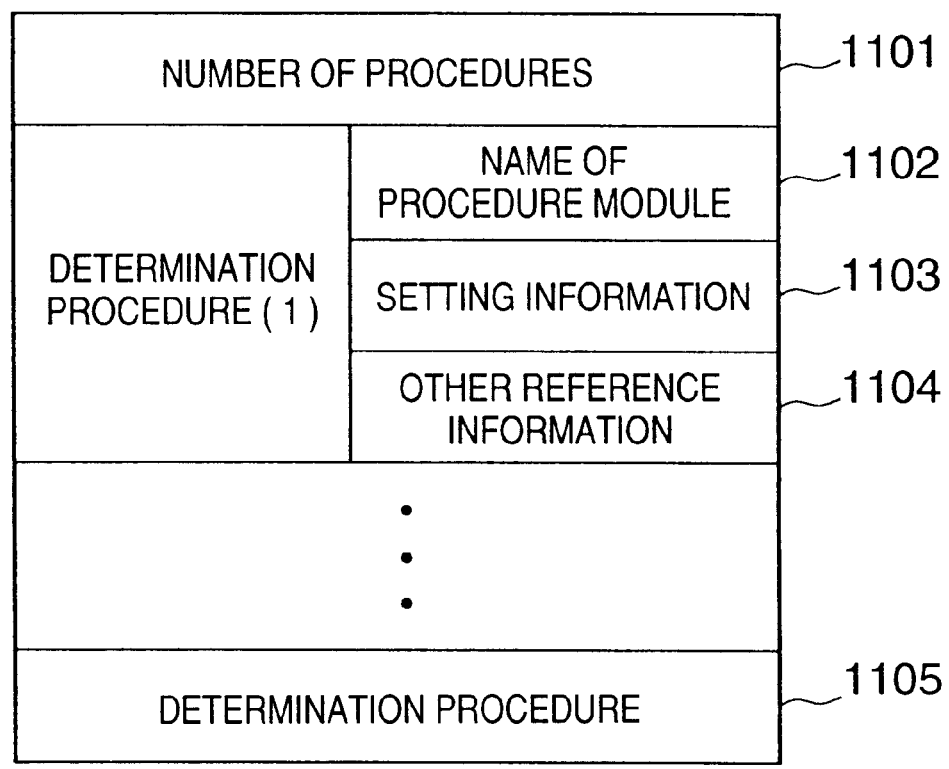
FIG. 11 shows a data structure of a setting file of the network attribute confirmation procedure.

Determination procedure (3): security of distribution destination with respect to whether or not the distribution destination is authorized to access distribution data FIG. 11 shows a data structure of the setting file for the network attribute confirmation procedure (details of the file will be described later). When there are a plurality of determination procedures, setting data, access data and the like are separately defined for each procedure, and condition setting is executed according to the defined information. Since the determination procedure (1) related to network traffic determination has already been described above, in the following description, determination procedures (2) and (3) are described with reference to the flowchart in FIG. 10.

In step S91, the setting file for the network attribute confirmation procedure is read. In step S92, the following modules registered in the setting file are called respectively for the determination procedures (1) and (2): a module for checking security setting of an intermediate server which exists in the distribution path; and a module for checking security setting of the distribution destination with respect to whether or not the distribution destination is authorized to access distribution data.

In step S93, the number of confirmation procedures=2 is set, and the loop counter is initialized to 1.

In step S94, the module of the procedure (1) is called, and it is determined whether or not the data distribution protocol is acceptable by the intermediate server.

The protocol is not acceptable if a network device in the distribution path is constructed to read the transmission originating port number of an IP packet header so as not to receive packets other than ones having a predetermined port number.

In this case, a network command such as a packet internet groper (PING) is transmitted to the distribution destination server, and if a response is returned, it is determined that the data distribution protocol is acceptable.

If it is determined in step S95 that the data distribution protocol is acceptable, the control proceeds to step S96, while if not, the control proceeds to step S911.

In step S96, the loop counter is incremented and compared with the number of confirmation modules. Since there is more confirmation module to be executed, the control proceeds to step S97.

In step S97, the module of procedure (2) is called. In a case where distribution data is transmitted as link data, it is determined whether or not the distribution destination is authorized under a security condition to access the distributed data.

In step S98, if it is determined that the destination is authorized to access the distributed data, the control proceeds to step S99, otherwise, the control proceeds to step S911.

In step S99, the loop counter is incremented and compared with the number of confirmation modules. Since the last confirmation module has been executed, the control proceeds to step S910.

In step S910, as a result of the determination performed by the determination module, determination is made that the distribution destination is on a network accessible to the distribution data, and the control ends. In step S911, determination is made that the distribution destination is not on a network accessible to the distribution data, and the control ends.

FIG. 11 shows a data structure of the setting file for the network attribute confirmation procedure described in FIGS. 9 and 10.

Reference numeral 1101 denotes the number of procedures included in the setting file. Reference numerals 1102 to 1104 denote contents of each determination procedure. 1102 denotes an area storing the name of procedure module and path information of where the module exists. 1103 denotes an area storing setting information referred to by the procedure module. 1104 denotes an area storing other access information referred to by the procedure module other than the above case. In the subsequent areas to 1104, determination procedure information is stored for the number set in the header of the setting file. In this example, N number of setting procedure information is stored as indicated by reference numeral 1105.

According to the above-described embodiment of the present invention, data distribution can be performed in the most appropriate network environment, distribution destination condition and so forth.

As has been described above, according to the data processing apparatus and method of the present invention, data can be distributed by an appropriate method based on the determination of set determination procedures, for instance, the size of distribution data, attribute of distribution destination network and so on.

Furthermore, by employing the data processing apparatus and method according to the present invention, the conventional problematic situation, such as, where the distribution destination cannot access the distributed data, or where an unnecessary load is imposed on the network, can be prevented.

As many apparently widely different embodiments of the present invention can be made without departing from the spirit and scope thereof, it is to be understood that the invention is not limited to the specific embodiments thereof except as defined in the claims.

What is claimed is:

1. A data processing apparatus comprising:
   distribution destination designation means for designating a distribution destination of data on a network;
   registering means for registering a plurality of servers corresponding to the distribution destination to be designated by said distribution destination designation means;
   specifying means for specifying data to be distributed to the designated distribution destination;
   determination means for determining a distribution method for distributing the specified data; and
   distribution means for distributing the specified data to the designated distribution destination in accordance with the distribution method determined by said determination means,
   wherein, in a case where said determination means determines that said distribution method comprises transmitting link information to the distribution destination, said distribution means transmits the data to one of the plurality of registered servers corresponding to the distribution destination designated by said distribution destination designation means, and consecutively transmits the link information for specifying the server and the data in the server to the distribution destination after the data is transmitted.

2. The data processing apparatus according to claim 1, wherein the determination of the distribution method is made based on a criterion of whether or not the specified data is accessible by the designated distribution destination.

3. The data processing apparatus according to claim 1, wherein the determination of the distribution method is made based on a criterion such that distribution of the specified data does not impose an excessive load on network communication.

4. The data processing apparatus according to claim 1, wherein said determination means determines the distribution method based on a criterion such that the specified data satisfies a setting condition of a determination procedure item of the designated distribution destination.

5. The data processing apparatus according to claim 1, wherein said determination means determines the distribution method based on at least one of the following criteria: data size, an attribute of a distribution destination network, or setting of the distribution destination.

6. The data processing apparatus according to claim 1, wherein said distribution means distributes the specified data as real data to the designated distribution destination in accordance with the determined distribution method.

7. The data processing apparatus according to claim 1, wherein said distribution means distributes the specified data as attachment data to an electronic mail to the designated distribution destination in accordance with the determined distribution method.

8. The data processing apparatus according to claim 1, wherein said determination means determines whether or not the size of the specified data is a predetermined size or larger, and
   in a case where the size of the specified data is the predetermined size or larger, the specified data is distributed as the link data to a distribution originator where the specified data is stored, whereas in a case where the size of the specified data is less than the predetermined size, the specified data is distributed to the distribution destination as attachment data to an electronic mail, or real data of the specified data is distributed to the distribution destination.

9. The data processing apparatus according to claim 1, further comprising:
   distribution data transfer means for transferring the specified data to another distribution destination on a network which is accessible by the distribution destination, in a case where the distribution destination is unable to access the specified data on the network; and
   informing means for informing the distribution destination of the link data of the another distribution destination.

10. The data processing apparatus according to claim 1, further comprising display control means for displaying brief contents of distributed data together with an icon identifying a data attribute, when data is distributed.

11. The data processing apparatus according to claim 1, wherein when said determination means makes a determination such that a server which is accessible by the distribution destination is detected in the network, said distribution means transmits the specified data to the detected server and distributes the link information to the distribution destination.

12. The data processing apparatus according to claim 1, wherein when said determination means makes a determination such that the server which is accessible by the designated distribution destination is not detected in the network, said distribution means directly distributes the specified data to the distribution destination.

13. The data processing apparatus according to claim 1, wherein in a case where data is distributed to a plurality of destinations, said distribution means detects a common server, in the network, which is accessible by the plurality of destinations, transmits the data to the detected server and distributes the link information to the plurality of destinations.

14. The data processing apparatus according to claim 1, wherein a condition of the server which is accessible by the distribution destination is that a protocol used in the transmission is acceptable by a server's communication path.

15. The data processing apparatus according to claim 14, wherein the condition of the server which is accessible by the distribution destination is that the distribution destination is authorized to access the server.

16. The data processing apparatus according to claim 1, wherein said determination means determines whether or not the specified data is accessible by the designated distribution destination, and
as a result of said determination, in a case where said determination means determines that the specified data is accessible, the link data or real data of the specified data is distributed to the distribution destination, whereas in a case where said determination means determines that the specified data is not accessible, the specified data is transmitted to the distribution destination as attachment data to an electronic mail.

17. The data processing apparatus according to claim 16, further comprising distribution data obtaining means for downloading the specified data from the distribution originator or the another distribution destination based on the link data.

18. A data processing method, comprising the steps of:
designating a distribution destination of data to be distributed on a network;
registering a plurality of servers corresponding to the distribution destination to be designated in said step of designating;
specifying data to be distributed to the designated distribution destination;
determining a distribution method for distributing the specified data; and
distributing the data to the designated distribution destination in accordance with the distribution method determined in said determining step,
wherein, in a case where said determination step determines that said method comprises transmitting link information to the distribution destination, said distributing step transmits the specified data to one of the registered servers corresponding to the distribution destination designated in said designating step, and consecutively transmits link information for specifying the server and the data in the server to the distribution destination after the data is transmitted.

19. The data processing method according to claim 18, wherein the determination of the distribution method is made based on a criterion of whether or not the specified data is accessible by the designated distribution destination.

20. The data processing method according to claim 18, wherein the determination of the distribution method is made based on a criterion such that distribution of the specified data does not impose an excessive load on network communication.

21. The data processing method according to claim 18, wherein in said determination step, the distribution method is determined based on a criterion such that the specified data satisfies a setting condition of a determination procedure item of the designated distribution destination.

22. The data processing method according to claim 18, wherein in said determination step, the distribution method is determined based on at least one of the following criteria: data size, attribute of distribution destination network, or setting of the distribution destination.

23. The data processing method according to claim 18, wherein in said distribution step, the specified data is distributed as real data to the designated distribution destination in accordance with the determined distribution method.

24. The data processing method according to claim 18, wherein in said distribution step, the specified data is distributed as attachment data to an electronic mail to the designated distribution destination in accordance with the determined distribution method.

25. The data processing method according to claim 18, wherein in said determination step, it is determined whether or not the specified data is accessible by the designated distribution destination, and
as a result of said determination, in a case where it is determined that the specified data is accessible, the link data or real data of the specified data is distributed to the distribution destination, whereas in a case where it is determined that the specified data is not accessible, the specified data is transmitted to the distribution destination as attachment data to an electronic mail.

26. The data processing method according to claim 18, further comprising the steps of:
transferring the specified data to another distribution destination on a network which is accessible by the distribution destination, in a case where the distribution destination is unable to access the specified data on the network; and
informing the distribution destination of the link data of the another distribution destination to the distribution destination.

27. The data processing method according to claim 18, further comprising a display control step of displaying brief contents of distributed data together with an icon identifying a data attribute, when data is distributed.

28. The data processing method according to claim 18, wherein when a determination is made in said determination step such that a server which is accessible by the distribution destination is detected in the network, the specified data is transmitted to the detected server, and the link information is distributed to the distribution destination.

29. The data processing method according to claim 18, wherein when a determination is made in said determination step such that a server which is accessible by the designated distribution destination is not detected in the network, the specified data is directly distributed to the distribution destination.

30. The data processing method according to claim 18, wherein in a case where data is distributed to a plurality of destinations, in said distribution step, a common server which is accessible by the plurality of destinations is detected in the network, the data is transmitted to the detected server, and the link information is distributed to the plurality of destinations.

31. The data processing method according to claim 18, wherein a condition of the server which is accessible by the distribution destination is that a protocol used in the transmission is acceptable by a server's communication path.

32. The data processing method according to claim 31, wherein the condition of the server which is accessible by the distribution destination is that the distribution destination is authorized to access the server.

33. The data processing method according to claim 18, wherein in said determination step, it is determined whether or not the size of the specified data is a predetermined size or larger, and in a case where the size of the specified data is the predetermined size or larger, the specified data is distributed as the link data to a distribution originator where the specified data is stored, whereas in a case where the size of the specified data is less than the predetermined size, the specified data is distributed to the distribution destination as attachment data to an electronic mail, or real data of the specified data is distributed to the distribution destination.

34. The data processing method according to claim 33, further comprising a distribution data obtaining step of downloading the specified data from the distribution originator or the another distribution destination based on the link data.

35. A storage medium storing program codes for causing a computer to execute a data processing method which controls data distribution on a network, said program comprising the steps of:

a distribution destination designation step of designating a distribution destination of data on the network;

a registering step of registering a plurality of servers corresponding to the distribution destination to be designated by said distribution destination designation step;

a specifying step of specifying data to be distributed to the designated distribution destination;

a determination step of determining a distribution method for distributing the specified data; and a distribution step of distributing the specified data to the designated distribution destination in accordance with the distribution method determined in said determination step, wherein, in a case where said determination step determines that said method comprises transmitting link information to the distribution destination, said distributing step transmits the specified data to one of the registered servers corresponding to the distribution destination designated in said designating step, and consecutively transmits link information for specifying the server and the data in the server to the distribution destination after the data is transmitted.

36. The storage medium according to claim 35, wherein when a determination is made by said determination step such that a server which is accessible by the distribution destination is detected in the network, said distribution step transmits the specified data to the detected server and distributes the link information to the distribution destination.

37. The storage medium according to claim 35, wherein when a determination is made by said determination step such that a server which is accessible by the designated distribution destination is not detected in the network, said distribution step directly distributes the specified data to the distribution destination.

38. The storage medium according to claim 35, wherein in a case where data is distributed to a plurality of destinations, said distribution step detects a common server, in the network, which is accessible by the plurality of destinations, transmits the specified data to the detected server and distributes the link information to the plurality of destinations.

39. The storage medium according to claim 35, wherein a condition of the server which is accessible by the distribution destination is that a protocol used in the transmission is acceptable by a server's communication path.

40. The storage medium according to claim 39, wherein the condition of the server which is accessible by the distribution destination is that the distribution destination is authorized to access the server.

* * * * *

UNITED STATES PATENT AND TRADEMARK OFFICE
CERTIFICATE OF CORRECTION

PATENT NO. : 6,775,688 B1
DATED : August 10, 2004
INVENTOR(S) : Kakimoto

It is certified that error appears in the above-identified patent and that said Letters Patent is hereby corrected as shown below:

Drawings,
Sheet 11, Fig. 10, "PROCEEDS" should read -- PROCEED --; and "AUTHORISZED" should read -- AUTHORIZED --.

Column 2,
Line 65, "on the" should read -- of the --.

Column 3,
Line 2, "on the" should read -- of the --.

Column 7,
Line 40, "F;" should be deleted.

Signed and Sealed this

Twenty-third Day of November, 2004

JON W. DUDAS
*Director of the United States Patent and Trademark Office*